June 27, 1967  K. PREECE  3,328,617
STATOR ASSEMBLIES FOR DYNAMO-ELECTRIC MACHINES
Filed March 30, 1965

United States Patent Office 3,328,617
Patented June 27, 1967

3,328,617
STATOR ASSEMBLIES FOR DYNAMO-ELECTRIC MACHINES
Kenneth Preece, Solihull, England, assignor to Joseph Lucas (Industries) Limited, Birmingham, England
Filed Mar. 30, 1965, Ser. No. 443,821
Claims priority, application Great Britain, Apr. 28, 1964, 17,504/64
5 Claims. (Cl. 310—180)

ABSTRACT OF THE DISCLOSURE

The invention comprises a stator assembly for a dynamo-electric machine which includes the combination comprising a cylindrical yoke, an even number of pole pieces on the inside of the yoke with each pole piece having one axial end rounded and adjacent pole pieces having their rounded ends at opposite axial ends of the yoke, and a field coil that extends around the inside of the yoke with the field coil being shaped to define portions which extend substantially axially relative to the yoke and which portions are joined by curved end portions which extend around the rounded ends of the pole pieces whereby three radial surfaces of each pole are embraced by said coil.

---

This invention relates to stator assemblies for dynamo-electric machines.

A stator assembly according to the invention comprises in combination, a cylindrical yoke, an even number of pole pieces on the inside of the yoke, each pole piece having one end thereof rounded and adjacent pole pieces having their rounded ends at opposite axial ends of the yoke, and a field coil extending around the inside of the yoke, the field coil being shaped to define portions which extend substantially axially relative to the yoke and are joined by curved end portions which extend around the rounded ends of the pole pieces.

Figure 1:
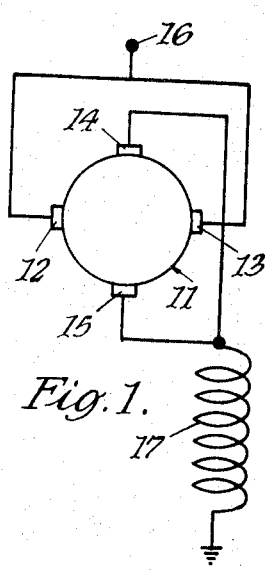
Figure 3:
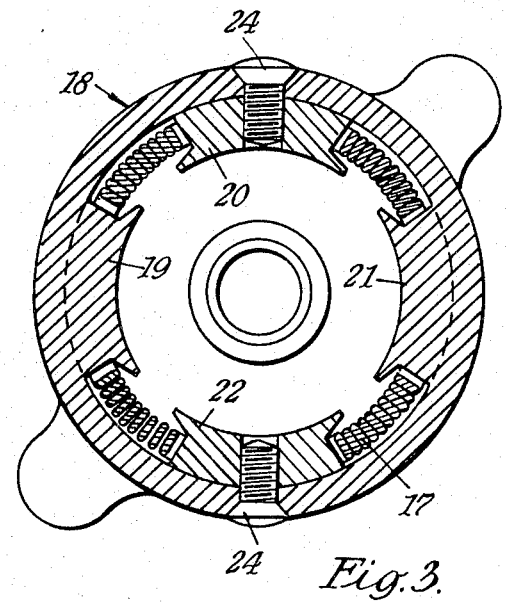
Figure 2:
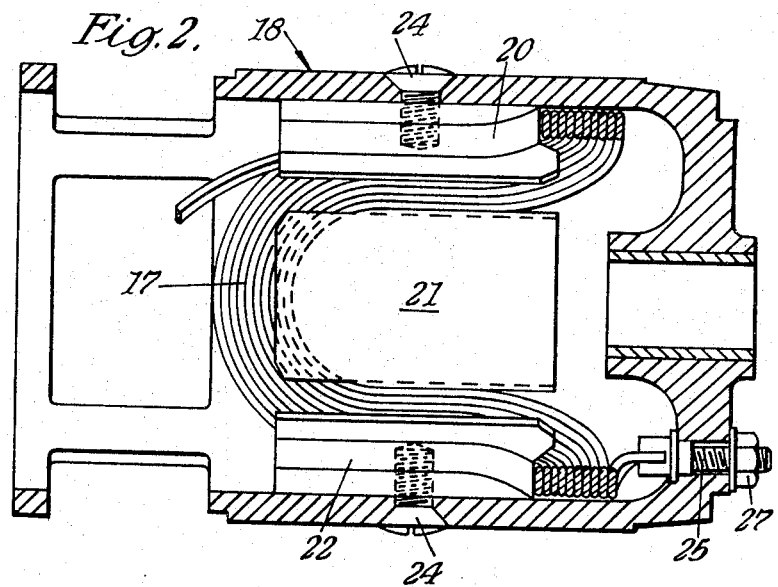
Figure 4:
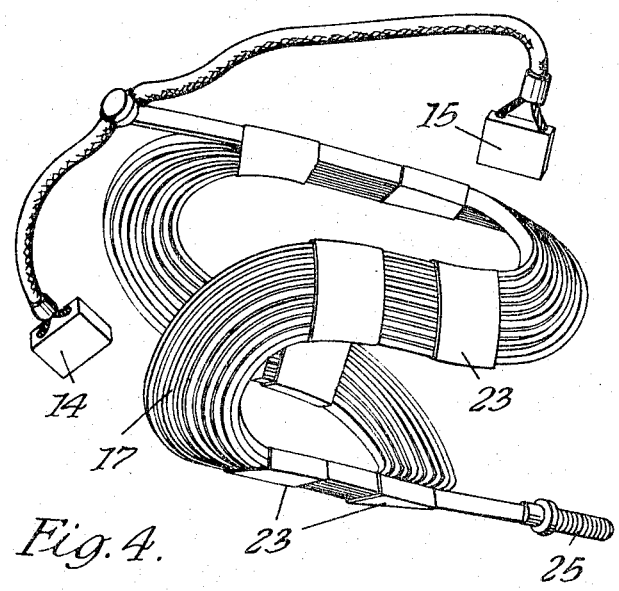
Figure 5:
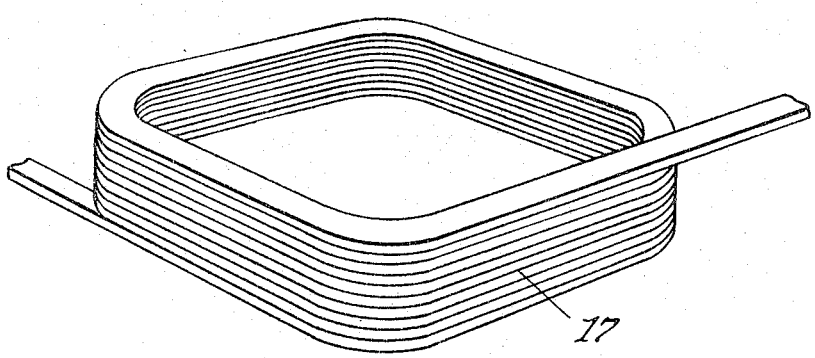

In the accompanying drawings, FIGURE 1 is a circuit diagram of a dynamo-electric machine having a stator assembly according to one example of the invention, FIGURES 2 and 3 are respectively longitudinal and cross-sections through the stator assembly, FIGURE 4 is a perspective view of the field coil, and FIGURE 5 is a perspective view of a coil from which the field coil shown in FIGURE 4 is formed.

Referring first to FIGURE 1, the armature 11, which is not shown in the other views, has four brushes 12, 13, 14, 15 associated therewith, the brushes being arranged in sets 12, 13 and 14, 15 with the brushes in the two sets alternately arranged. The brushes 12, 13 are connected to a terminal 16 for conveying current to or from the armature 11, and the brushes 14, 15 are earthed through a field coil 17 in series with the armature.

The stator assembly (FIGURES 2 and 3) includes a cast iron cylindrical yoke 18 on the interior of which are provided four equi-angularly spaced pole pieces 19, 20, 21, 22. Each pole piece extends axially relative to the yoke and is formed with one flat end and one rounded end, the rounded ends of the pole pieces 19, 21 being at one end of the yoke, and the rounded ends of the pole pieces 20, 22 being at the other end of the yoke so that adjacent rounded ends are at opposite axial ends of the yoke 18.

The pole pieces serve to hold in position the field coil 17, which is formed from flat strip coated with insulating varnish. Referring to FIGURE 5, the strip is first wound into a generally square helical form with the flat faces of the strip in contact and the corners rounded, the radius of each corner being equal to the radii of the rounded ends of the pole pieces. One pair of diagonally opposite corners are then bent down into the plane of the paper as viewed in FIGURE 5, and the other pair of diagonally opposite corners are bent up out of the plane of the paper, thereby producing the coil 17 shown in FIGURE 3. This coil would if considered in developed view be sinusoidal, and when in position as shown in FIGURES 2 and 3 has portions which extend substantially axially relative to the yoke 18 and are located in the spaces between the pole pieces, and curved portions joining the axial portions and extending around the rounded ends of the pole pieces. Preferably, insulating strips 23 (FIGURE 4) are wrapped around the coil to hold the turns of the strip in contact.

The pole pieces may all be detachable from the yoke but preferably as shown one set of pole pieces 19, 21 are cast integrally with the yoke 18. In order to assemble the stator, the coil 17 is moved axially into position in the yoke 18 so that one pair of curved portions of the coil engage the rounded ends of the pole pieces 19, 21 which are adjacent the end of the yoke through which the coil is introduced. The other pair or set of pole pieces 20, 22 are then secured to the yoke by one or more bolts 24 to hold the coil in position as shown. The coil 17 is formed with a screw-threaded terminal 25 which extends through the yoke 18 and is connected thereto by a nut 27 to provide the earth connection to the coil 17, the other end of the coil 17 being connected to the brushes 14, 15 which are omitted from FIGURE 2.

Where the stator is part of a motor which it is desired to operate at two speeds, two strips may be wound in facial contact but separated by insulating material to form a field coil which consists of two separate windings which can be energised singly or in combination to give the required speeds.

In the example shown the coil 17 is actually held in position by the pole pieces by virtue of the shape of the pole pieces, but the coil could be held in position in other ways, for example by parts secured to the yoke.

Having thus described my invention what I claim as new and desire to secure by Letters Patent is:

1. A stator assembly for a dynamo-electric machine, comprising in combination a cylindrical yoke, an even number of pole pieces on the inside of the yoke, each pole piece having one end thereof rounded and adjacent pole pieces having their rounded ends at the opposite axial ends of the yoke, and a field coil extending around the inside of the yoke, the field coil being shaped to define portions which extend substantially axially relative to the yoke and are joined by curved end portions which extend around the rounded ends of the pole pieces.

2. An assembly as claimed in claim 1 in which the field coil is held in position by the pole pieces.

3. An assembly as claimed in claim 1 in which the pole pieces are all detachable from the yoke.

4. An assembly as claimed in claim 1 in which there are sets of alternately arranged pole pieces, one set of said alternately arranged pole pieces being detachable from the yoke, and the remaining pole pieces being integral with the yoke and have their rounded ends adjacent the end of the yoke through which the coil is introduced, so that with said one set of pole pieces removed the coil can be inserted into the yoke and then held in the yoke by securing said one set of pole pieces in position.

5. An assembly as claimed in claim 1 in which one end of the field coil is connected to the yoke and so is earthed.

No references cited.

MILTON O. HIRSHFIELD, *Primary Examiner.*
L. L. SMITH, *Assistant Examiner.*